(12) United States Patent
Mayrhofer et al.

(10) Patent No.: US 8,418,542 B2
(45) Date of Patent: Apr. 16, 2013

(54) TEST STAND ASSEMBLY INCLUDING CONNECTING SHAFT HAVING ADAPTOR FLANGE WITH SELECTED MASS AND MOMENT OF INERTIA

(75) Inventors: Josef Mayrhofer, Graz (AT); Helmut Kokal, St. Josef (AT); Stefan Dragaschnig, Graz (AT); Joachim Schmidt, Werndorf (AT); Gerald Hochmann, Graz (AT); Dirk Denger, Graz (AT); Martin Schmidt, Langen (DE)

(73) Assignee: AVL List GmbH, Graz (AT)

( * ) Notice: Subject to any disclaimer, the term of this patent is extended or adjusted under 35 U.S.C. 154(b) by 388 days.

(21) Appl. No.: 12/801,581

(22) Filed: Jun. 15, 2010

(65) Prior Publication Data

US 2011/0000291 A1 Jan. 6, 2011

(30) Foreign Application Priority Data

Jun. 16, 2009 (AT) .......................... GM 369/2009 U

(51) Int. Cl.
*G01M 15/02* (2006.01)
(52) U.S. Cl.
USPC .................. 73/116.05; 73/115.01; 73/116.02
(58) Field of Classification Search ............... 73/114.13, 73/114.15, 115.01, 115.05, 116.01, 116.02, 73/116.04, 116.05
See application file for complete search history.

(56) References Cited

U.S. PATENT DOCUMENTS

| | | | | |
|---|---|---|---|---|
| 4,466,294 A | * | 8/1984 | Bennington et al. ....... | 73/862.13 |
| 4,899,595 A | * | 2/1990 | Warsaw ..................... | 73/862.14 |
| 5,375,460 A | * | 12/1994 | La Belle .................... | 73/116.06 |
| 5,445,013 A | * | 8/1995 | Clayton et al. ............. | 73/116.06 |
| 5,452,605 A | * | 9/1995 | Wilson et al. .............. | 73/116.06 |
| 5,465,612 A | * | 11/1995 | La Belle .................... | 73/116.06 |
| 5,986,545 A | * | 11/1999 | Sanada et al. ................ | 340/439 |
| 6,360,591 B1 | * | 3/2002 | Carley ....................... | 73/116.06 |
| 6,651,493 B2 | * | 11/2003 | Myers et al. ............... | 73/116.05 |
| 6,860,145 B2 | * | 3/2005 | Bergst et al. ..................... | 73/123 |
| 7,926,336 B2 | * | 4/2011 | Vickio et al. ............... | 73/116.05 |
| 2004/0200272 A1 | * | 10/2004 | Bergst et al. .................... | 73/123 |
| 2006/0042365 A1 | * | 3/2006 | Bond ........................... | 73/117.3 |
| 2008/0190183 A1 | * | 8/2008 | Erlach et al. ............... | 73/114.01 |
| 2010/0050759 A1 | * | 3/2010 | Vickio et al. ............... | 73/116.06 |

FOREIGN PATENT DOCUMENTS

| | | |
|---|---|---|
| JP | 9178616 | 7/1997 |
| JP | 2000039380 | 2/2000 |
| JP | 2000039381 | 2/2000 |
| JP | 2000105172 | 4/2000 |
| JP | 2006271057 | 10/2006 |
| JP | 2006322771 | 11/2006 |

OTHER PUBLICATIONS

English Abstract of JP9178616.
English Abstract of JP2006322771.

(Continued)

*Primary Examiner* — Eric S McCall
(74) *Attorney, Agent, or Firm* — Dykema Gossett PLLC

(57) ABSTRACT

A test stand assembly includes an electric machine (4) for driving and/or loading a test object (1), which is connected by a connecting shaft (2) having an adapter flange (3) to the electric machine (4). The assembly has a constant, predetermined moment of inertia, and the mass and the moment of inertia of the adapter flange (3) are selected in such a manner that the resonant frequency of the system formed of test object (1), adapter flange (3), connecting flange (2), and electric machine (4) for driving and/or loading the test object (1) lies between the idle frequency and the partial load frequency of the test object (1).

7 Claims, 1 Drawing Sheet

OTHER PUBLICATIONS

K. Shirota, et al., "Virtual Dynamic Load Testing for Engine," Society of Automotive Engineers of Japan, Inc., No. 66-00, May 2000, pp. 1-4.

T. Kaniyama, et al., "The Extreme Low Inertia Dynamometer Attaining the Gearless," No. 260, Jun. 29, 1998, pp. 12-17 (with English Abstract).

English Abstract of JP 2006271057.
English Abstract of JP 2000039381.
English Abstract of JP 2000105172.
English Abstract of JP 2000039380.
English Translation of JP Utility Model App. Pub. Hei-05-023094, dated Mar. 26, 1993.

* cited by examiner

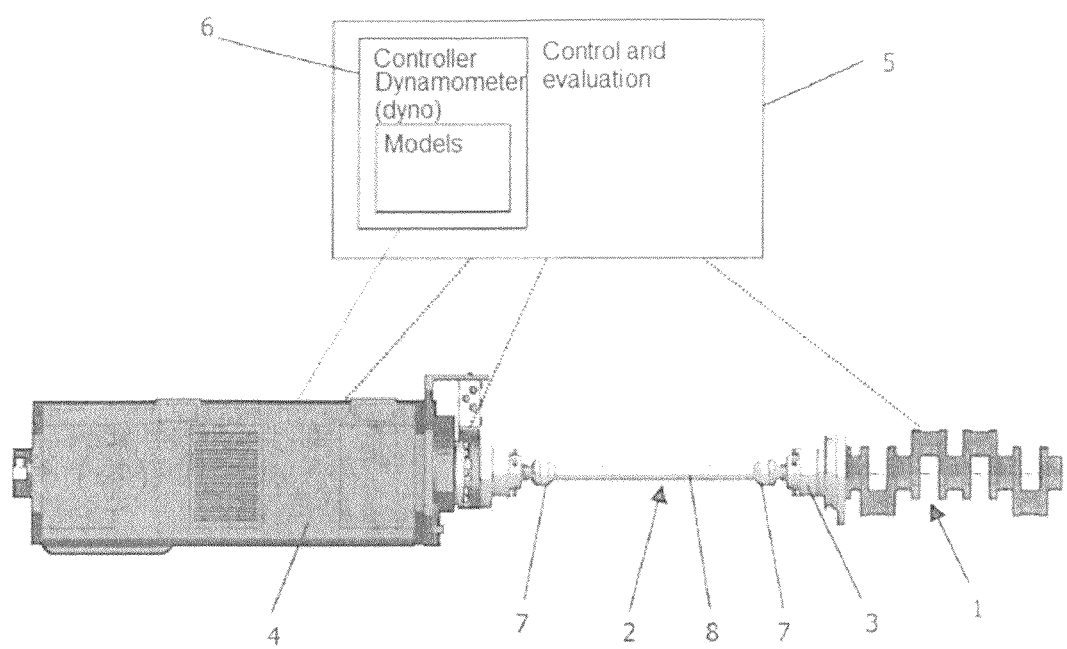

TEST STAND ASSEMBLY INCLUDING CONNECTING SHAFT HAVING ADAPTOR FLANGE WITH SELECTED MASS AND MOMENT OF INERTIA

BACKGROUND OF THE INVENTION

1. Field of the Invention

The invention relates to a test stand arrangement with a test object which is connected by means of a connecting shaft having an adaptor flange and a torque measuring flange to an electric machine for driving and/or loading the test object, and with a feedback control arrangement for the electric machine for driving and/or loading the test object.

2. The Prior Art

Increasing fuel prices and legal regulations with respect to emission and $CO_2$ in combination with high customer expectations regarding comfort results in a constantly increasing demand for cost-optimized vehicles with highly innovative drivetrains. For this reason, vehicle manufacturers are facing the challenge of developing highly complex drivetrains in a rapid and goal-oriented manner. In order to meet these challenges, different strategies have been developed wherein the "front loading" of the development process based on the strategy approach "road-to-lab-maths" has proven to be the core strategy. Here, development tasks which previously could be processed only in expensive prototype environments are to be transferred into early process phases, as described, for example, in Gschweitl K., Ellinger R., Loibner E.: "Werkzeuge und Methoden im Hybrid Entwicklungsprozess", 19. "Motor und Umwelt"-conference Graz 2007, in Schyr C., Gschweitl K.: "Methodische Validierung von hybriden Antriebssträngen", 2. Internationales Symposium für Entwicklungsmethodik, Darmstadt, 2007, or in Beidl C., Rainer G., Schoeggl P., Martini E.: "Enabling Future Powertrain Solutions by innovative Simulation & Testing Toolchains", $32^{nd}$ FISITA World Automotive Congress, Munich, 2008. The prototype environments are to be replaced by simulations. However, this strategy requires that continuous development environments are available for the developer in which he can consider the vehicle as a complete system, but also the interactions of the same with its environment.

In order to be able to transfer topics, such as driveability calibration, in high-quality manner onto the engine test stand, it is necessary to be capable of mapping effects which are relevant later for the customer's comfort. Current test stand systems are able to map such drivetrain simulations only up to approximately 8-10 Hz, which is insufficient.

Thus, it was the object of the present invention to provide a test stand arrangement, in particular an engine test stand, which, by avoiding the disadvantages which became apparent in the description above, is able to establish the connection of the drivetrain and vehicle simulation with the vehicle-specific combustion behavior and transient behavior of the engine. In particular, it should be possible to represent the cyclic irregularity of the internal combustion engine in detail, which was not possible up to now, and to transfer the induced frequencies, up to 40 Hz, from the drivetrain to the combustion engine.

SUMMARY OF THE INVENTION

To solve this object it is provided according to the invention that the arrangement consisting of connecting shaft and drive and load machine has a constant, predetermined moment of inertia, and that the mass and the moment of inertia of the adaptor flange is selected in such a manner that the resonant frequency of the system consisting of test object, adaptor flange, connecting shaft and electric machine for driving and/or loading the test object lies between the idle frequency and a partial load frequency of the test object. By means of this system configuration, for example, the realistic representation of "real" combustion pulses with misfires, or the hybrid-relevant start/stop operation in combination with highly developed vehicle simulation can now also be implemented on the test stand. Thus, this test stand configuration is extremely suitable for work in the engine and drivetrain area which requires a high correlation to the real transient vehicle behavior.

A particularly important topic is the representation of drivetrain vibrations up to 40 Hz with the possibility of a safe and accurate regulation of the mechanical oscillating system engine—shaft—load unit in this frequency range, i.e., at a mechanical resonant frequency of the test stand assembly which lies within the operating range of the engine. According to an advantageous exemplary embodiment of the invention it is thus provided that the moment of inertia of the adaptor flange is selected in such a manner that the resonant frequency lies between 10 Hz and 100 Hz, preferably between 20 Hz and 60 Hz.

Preferably, the connecting shaft is designed as a constant velocity joint shaft.

To be able to reliably reproduce the real transient feedback effects in the vehicle behavior by a simulation, a load unit is necessary which is characterized by the lowest possible natural flywheel mass and a high adjusting speed. Thus, a further exemplary embodiment of the invention is characterized in that the electric machine for driving and/or loading the test object has a moment of inertia which is as low as possible.

Preferably, it is additionally provided that the electric machine for driving and/or loading the test object has a ratio of torque to moment of inertia which is as high as possible. The two mentioned features have to provide that the electric machine for driving and/or loading the test object has a high acceleration and deceleration capability.

According to a particularly advantageous configuration of the invention, the electric machine for driving and/or loading the test object, in particular the rotor of the machine, is prepared for angle-synchronous, impact-like, high torque loads.

The above mentioned requirement can be implemented in a particularly good manner if the drive and load machine is configured as a three-phase machine, preferably as an asynchronous machine, separately excited or permanent magnet-excited synchronous machine.

In the following description, the invention is illustrated in more detail based on a preferred exemplary embodiment and the attached figure.

BRIEF DESCRIPTION OF THE FIGURE

The attached figure shows a schematic illustration of a test stand arrangement according to the present invention.

DETAILED DESCRIPTION OF THE FIGURE.

The figure shows an engine test stand with an internal combustion engine as test object 1 which is symbolized by its crankshaft. The test object 1 is connected by means of a shaft 2 and an adapter flange 3 with an electric machine 4 for driving and/or loading the test object 1. The control and evaluation unit 5, which also can be part of a superordinate test stand automation system, includes also a feedback control arrangement 6 for the electric machine 4. While the test object 1 is actually assembled, components which can be connected thereto can be replaced by a simulation for which at least one model for such components which can be connected to the test object 1 is implemented in the feedback control 6, from which model then the feedback control request for the electric machine 4 is determined.

The arrangement consisting of connecting shaft 2 and electric machine 4 has a constant, predetermined moment of inertia. In addition, the mass and the moment of inertia of the adapter flange 3 are selected in such a manner that the resonant frequency of the system consisting of test object 1, adapter flange 3, connecting shaft 2 and electric machine 4 lies between the idle frequency and a partial load frequency of the test object 1, i.e., preferably between approximately 20 and 60 Hz. In this frequency range, a realistic representation of the cyclic irregularity of the combustion engine as test object 1 is possible since induced frequencies can be transferred from the drivetrain or other models to the combustion engine. The shaft 2 acts here like a low-pass filter with a low-pass frequency which is shifted upward with respect to previous stands.

Advantageously, the safe and accurate regulation of the mechanical oscillation system consisting of test object 1, adapter flange 3, connecting shaft 2 and electric machine 4 can be supported in this frequency range, i.e., at a mechanical resonant frequency of the test stand which lies in the operating range of the engine, by a suitable feedback control strategy. For this, the feedback control arrangement 6 comprises, for example, a controller and an actual value calculation unit which is arranged in a feedback branch. In the actual value calculation unit, a current actual value of the feedback control and a prediction of an upcoming, system delay-free actual value can be processed based on the actual value of a previous work cycle to form a modified actual value which is fed back to the feedback control.

Advantageously, the connecting shaft 2 is designed as constant velocity joint shaft. It has two constant velocity joints 7 on the ends of a steel pipe 8 with adapted stiffness and torque transmission capability. Due to the constant velocity joints 7, the geometrical alignment of test object 1 and electrical machine 4 is not very critical and can be carried out in a very simple manner compared with conventionally used torsion bars. Also, the same shaft 2 can be used for many different test objects 1, whereas previously, the design of the shaft 2 had to be recalculated for each test object 1 and a specifically adjusted shaft had to be assembled.

For a good reproduction via simulation of the feedback effects of the components connected to the test object 1, the drive and/or load unit 4 has a moment of inertia which is as small as possible as well as a ratio of torque to moment of inertia which is preferably as high as possible. The two mentioned features ensure the necessary high acceleration or deceleration capability, which is expressed by the value "revolutions per time unit per time unit" (rpm/sec), which is preferably not below 30,000 rpm/sec and which is calculated from the nominal moment, the potential overload, and the moment of inertia of the machine.

According to a particularly advantageous configuration of the invention, the electric machine 4, in particular its rotor, is prepared for angle-synchronous, impact-like, high torque loads. Also, measures to prevent eddy currents and thus excessive heat development contribute to this, in particular in the area of the mounting rings of the electric machine 4.

The mentioned requirements can be implemented in a particular good manner if the electric machine 4 is configured as a three-phase machine, preferably as an asynchronous machine, separately excited or permanent magnet-excited synchronous machine.

With the test stand arrangement according to the invention, for example, the realistic mapping of the rotational irregularity within the entire speed band of a combustion engine as test object 1 is possible. This is the base for the transfer of SOP-oriented development and calibration tasks from the vehicle to the engine test stand (e.g., driveability, OBD, start/stop, development of vehicle-auxiliaries drive systems, structure-borne noise analyses etc.). This relates also to the detection of misfires in gasoline engines, whereby now, by means of the test stand arrangement according to the invention, the OBD-relevant rotational irregularity signal can be obtained as in the vehicle, which was not possible up to now on any engine test stand because conventional test stand systems, in combination with conventional feedback control, are smoothing this behavior. And, the behavior of multi-mass or dual mass flywheels, which are particularly essential for hybrid drives, can be simulated without being dependent on the availability of prototypes, which behavior is characterized by the rotational irregularity which is increasing towards the engine. By means of the features according to the invention, the effect of multi-mass flywheels on the combustion engine can now be studied in a systematic and highly efficient manner.

Also, for tasks such as driveability calibration, which is to be transferred in a high-quality manner onto the engine test stand, it must be possible to map effects which are relevant to the subjective customer comfort. Driveability is to be understood as the subjective feeling of a driver during interaction with a vehicle. In the drivetrain development process, it is standard to differentiate between the development objectives driving performance, fuel consumption, emissions and driveability. The set-up and optimization of the respective objectives takes places in most cases on different platforms: Driving performance and consumption e.g., on the drivetrain test stand, consumption and emissions on the roller dynamometer. The set-up of driveability takes place exclusively in the vehicle based on the subjective evaluation of test drivers. However, if no satisfactory drivability set-up is achieved, repeat loops in the development process cannot be avoided. A global common optimum is difficult to find due to the separate set-up of the development objectives.

By using methods for simulation and objective evaluation of driveability during the drivetrain development process, it is possible to get around the above mentioned problems. By integration on the engine test stand, many set-up tasks can now be carried out earlier in the development process. Here too, the setting according to the invention of the test stand arrangement to a resonant frequency of the system between 10 Hz and 100 Hz, preferably between 20 Hz and 60 Hz, is of advantage since many drivability maneuvers generate vibrations within this range. For example, vibrations of the drivability maneuver "tip in" (positive Bonanza effect caused by the gas pedal) can reach up to 40 Hz.

In addition, the test stand arrangement according to the invention allows the time- and material-saving analysis of questions with respect to the effect of different connected Drivetrain components by means of the simulation of their feedback effect in the mentioned frequency range, for example starting or stopping, without the need of carrying out tests with a plurality of real components. Also, no expensive test vehicles or component prototypes are necessary, the representation of hardware changes or variants is possible within a short amount of time, other components can be replaced faster than in real vehicles, the tests can readily be compared with one another because the development environment remains always constant, and comprehensive measuring equipment can be used as desired.

The invention claimed is:

1. A test stand assembly comprising:
 a test object,
 an electric machine for driving and/or loading the test object,
 a connecting shaft having an adapter flange connected between the test object and the electric machine, and
 a feedback control arrangement for the electric machine for driving and/or loading the test object,
 wherein the assembly consisting of connecting shaft and electric machine has a constant, predetermined moment of inertia, and a mass and moment of inertia of the adapter flange is selected in such a manner that resonant frequency of the assembly consisting of test object, adapter flange, connecting shaft, and electric machine lies between an idle frequency of the test object and a partial load frequency within an operating range of the test object.

2. The test stand assembly according to claim 1, wherein the connecting shaft consists of a constant velocity joint shaft.

3. The test stand assembly according to claim 1, wherein the electric machine consists of a three-phase asynchronous, separately excited or permanent magnet-excited synchronous machine.

4. The test stand assembly according to claim 1, wherein the moment of inertia of the adapter flange is selected such that the resonant frequency of the system (1, 2, 3, 4) lies between 10 Hz and 100 Hz.

5. The test stand assembly according to claim 4, wherein the resonant frequency of the system is 20 to 60 Hz.

6. The test stand assembly according to claim 1, wherein the electric machine is prepared for angle-synchronous, impact-like high torque loads.

7. The test stand assembly according to claim 6, wherein said electric machine includes a rotor prepared for angle-synchronous, impact-like high torque loads.

* * * * *